United States Patent [19]

Megnint

[11] Patent Number: 4,641,040
[45] Date of Patent: Feb. 3, 1987

[54] LOW-HEAD HYDROELECTRIC INSTALLATION

[75] Inventor: Lucien Megnint, Grenoble, France

[73] Assignee: Neyrpic, Grenoble, France

[21] Appl. No.: 704,981

[22] Filed: Feb. 25, 1985

[30] Foreign Application Priority Data

Feb. 24, 1984 [FR] France .................... 84 02814

[51] Int. Cl.⁴ .......................... H01D 15/10
[52] U.S. Cl. .................... 290/52; 363/165; 322/14
[58] Field of Search ............ 290/52, 43, 54, 44, 290/55; 322/14; 363/159, 165

[56] References Cited

U.S. PATENT DOCUMENTS 1,674,610  6/1928  Pfau ........................ 137/1
4,367,890  1/1983  Spirk ....................... 290/52

Primary Examiner—L. T. Hix
Assistant Examiner—Brian W. Brown
Attorney, Agent, or Firm—Pollock, Vande Sande & Priddy

[57] ABSTRACT

Low-head hydroelectric installation, in particular for a tidal power station, intended to operate under variable heads of water that can fall to values in the region of zero. When the head of water is lower than a defined value (Hd), lower than at least half the nominal head (Hn), the turbo-machine (1) is made to rotate at a speed (n1, n2, n2, ... ) lower than the synchronous speed (ns) and bringing its efficiency near to the heart of the efficiency contours. For this purpose, a frequency converter (7) is inserted between the rotary electrical machine (3) and the network (4), the converter (7) being constructed for a power in all cases lower than at least half the nominal power (Pn).

5 Claims, 2 Drawing Figures

LOW-HEAD HYDROELECTRIC INSTALLATION

FIELD OF THE INVENTION

The present invention relates to a low-head hydroelectric installation intended to operate under variable heads of water or pressure heads that can fall to very low values, in the region of zero, as for example is the case of a hydroelectric installation equipping a tidal power station.

Traditionally a distinction is made between low head hydroelectric power stations, of river or tidal type, that operate under a head of water or pressure head of between zero and a maximum of twenty meters, and high-head hydroelectric power stations, of dam power station type, that operate under much higher heads of water or pressure heads, often in the order of several hundred meters.

For certain low-head power stations, in particular for tidal power stations, the head can vary widely, but each turbo-machine, such as turbine, turbine-pump or pump, is calculated and therefore constructed to have its best efficiency in the region of the most frequent head, called the nominal head. For tidal power stations for example, this most frequent or nominal head is in the order of 5 to 10 meters.

Unfortunately the efficiency of these turbo-machines decreases very rapidly below these head values such that the lowest heads, for example less than half or a quarter of the nominal head, are not used for turbine actuation as they are not sufficiently profitable and that in pumping it becomes necessary to consume a rather considerable amount of power.

Taking, by way of illustrative example, the case of a tidal power station in which the head of water for turbine actuation varies from 7 to 1 meters and for pumping from 0 to 2 meters, approximately 300 GWh is consumed in pumping while 430 GWh are produced by turbine action.

SUMMARY OF THE INVENTION

The purpose of the invention is to overcome these disadvantages, and therefore to enable a larger production by turbine action and a lower consumption in pumping, due to means enabling a considerable increase in the efficiency of the turbo-machine when the head becomes less than a specified fraction of the nominal head.

The low-head hydroelectric installation in accordance with the invention is of the type including:

(a) at least one hydraulic turbo-machine, turbine, turbine-pump or pump, subject to the head of water and constructed to give maximum efficiency at a defined head, called the nominal head, corresponding to a nominal power of the installation, and for a speed of rotation corresponding to the speed of synchronism with the frequency of the electrical network, (b) at least one rotary electrical machine, alternator under turbine action and motor in pumping, drive-coupled to the said turbo-machine and electrically connected to the network, (c) means of automatic control, regulator or more generally automatic installation control, enabling the said turbo-machine to be rotated at the synchronous speed, (d) means making it possible, when the head of water is less than a defined fraction of the said nominal head, in all cases less than half of the latter, to make the said turbo-machine rotate at a speed lower than the said synchronous speed, and consequently to insert between the network and the said electrical machine a frequency matching device of maximum power at least less than half the said nominal power.

By these means the efficiency of the installation is considerably increased for the lowest heads of water only, such that it results for certain applications in a considerable reduction in the power consumed in pumping that reduces, for example in the previously used illustrative example, from about 300 GWh to about 200 GWh, and an appreciable increase in the power produced by turbine action, that increases in this example from about 430 GWh to about 500 GWh. The total power produced by this tidal power station, cited to give orders of magnitude, increases therefore, due to the means of the invention, from 130 to 300 GWh. Obviously, the embodiment of the invention necessitates the installation of a frequency converter which, if it were to operate over the whole range of head of water, would have to prohibitively expensive; it would, in fact, be costly in order to be able to support high powers, and its own efficiency could easily drop to values in the order of a few percent. By using, in accordance with the invention, a frequency converter solely for the very low heads, and therefore low powers, this converter can be constructed for a much lower maximum power; in addition, since its own loss of efficiency then becomes negligible compared to the gain in performance due to the reduction in the speed of rotation of the turbo-machine, its use becomes very profitable. This does not naturally spring to mind, as a specialist in the field calculating an installation of a certain nominal power is normally inclined to include in it a frequency converter of the same power, which shows itself to be economically unacceptable as has been shown above.

BRIEF DESCRIPTION OF THE DRAWINGS

The invention will be better understood with the help of the following description of an exemplary embodiment, intended for a tidal power station, given with reference to the appended drawings in which.

DETAILED DESCRIPTION

Figure 1:
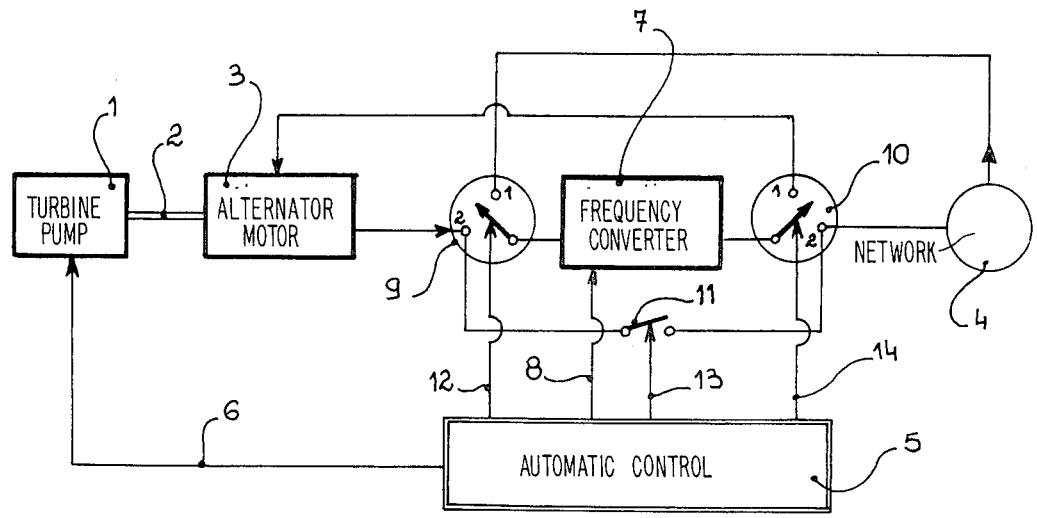
FIG. 1 is a block diagram of the hydroelectric installation of the invention.

FIG. 1 shows a turbine-pump 1 mechanically connected by a shaft 2 to a rotary electrical machine 3, functioning as an alternator under turbine action and as a synchronous motor in pumping. When the turbo-machine 1 functions as a turbine, the alternator 3 has the function of supplying electrical energy to the electrical distribution network 4. On the other hand, in order for the turbo-machine 1 to function as a pump, the synchronous motor 3 must be fed with electrical energy by the network 4. Under standard conditions, the electrical machine 3 is directly coupled to the network, such that it is mandatory for it to rotate at the synchronous speed corresponding to the frequency of the latter. The automatic control or control computer 5 of the hydroelectric power station therefore has a connection 6 to the turbo-machine 1 having the function of making that turbo-machine rotate at the speed of synchronism with the frequency of the A.C. electric network 4.

In the conventional manner, a turbo-pump such as 1 is designed and constructed in order to function with maximum efficiency, for example 90%, for the nominal head of water, for example nine meters. For this nominal head, it operates at nominal power, 17 MW in the considered example. For heads of water below the nominal head, the efficiency of the turbine-pump drops very rapidly. In the considered example, when the head of water drops to 2.5 meters and the power that depends on it is then no more than 5 MW, the efficiency of the turbo-machine is no more than in the order of 45%.

Traditionally the manufacturer provides, for a given installation, a topographic diagram of curves of equal efficiency, called "efficiency contours" analogeous to the height contour lines on a topographic map. These curves are most often plotted in reduced coordinates, giving the flow of the turbo-machine for a wheel one meter in diameter under a head of one meter, as a function of its speed of rotation, also reduced to a wheel of one meter diameter under a head of one meter.

The examination of this efficiency contour is not a priori very encouraging as regards power stations that have to function under variable heads of water, as is the case for tidal power stations. In fact, it is noted that the operating point rapidly moves away from the heart of the contour when the head drops, and that the only means of bringing it back is to lower the speed of rotation of the turbo-machine, which would lead to having to install a frequency converter between the rotary electric machine and the network, intended to match the operating frequency of this machine to the fixed frequency of the network. Now, a brief study quickly shows that the economic balance resulting from the installation of such a frequency converter is prohibitive. For high nominal powers, 17 to 20 MW in the considered example, such a converter is very costly, so that it is not profitable at low powers, and its own losses are such that in the region of the heart it is not possible to see any substantial contribution to gain in efficiency.

The applicant has found that it was possible to obtain a substantially positive economic balance by installing, between the electric machine 3 and the network 4, a frequency converter 7 of low maximum permissible power, e.g., 5 MW in the example quoted above in which the nominal power is 17 MW, and by inserting this converter, normally out of circuit, only when the head of water becomes less than a small fraction of the nominal head, in the order of a quarter of it, for example. It is then possible, by the automatic control 5 and connection 6, to lower the speed of rotation of the turbo-machine so as to substantially increase the efficiency, advantageously bringing it close to its maximum, for example 87%. Correlatively, the automatic control 5 controls the frequency converter 7 by the connection 8 to enable it to match the frequency imposed by the speed, then reduced, of the electric machine 3, to the frequency of the network 4.

In FIG. 1, the device enabling the frequency converter 7 to be inserted is represented diagrammatically by two two-way switches 9, 10, placed respectively upstream and downstream of the converter 7, and by a switch 11 enabling the said converter to be short-circuited. These three switches 9, 10 and 11 are controlled by the automatic control 5, over lines represented diagrammatically as 12, 13 and 14.

The functioning of the device in FIG. 1 is as follows: In turbine action, as long as the head of water remains greater than a defined value Hd, for example 2.5 meters for a nominal head of 9 meters, the switch 11 is closed, the switches 9 and 10 being in position "2". The frequency converter 7 is short-circuited and out of service. The turbine 1 rotates at its speed of synchronism with the frequency of the network and the alternator 3 feeds directly into the network 4.

When the head of water becomes equal to or less than the value Hd, in this case 2.5 meters, the automatic control 5 causes the opening of switch 11, which puts the converter 7 in circuit between the alternator 3 and the network 4; at the same time the automatic control 5 controls on the one hand via connection 6 the speed of rotation of the turbine in order to lower it to a value depending on the head, increasing the efficiency to about 85 to 87%, and , on the other hand, via connection 8, the frequency converter 7 so that it supplies on output an electrical voltage of frequency equal to that of the network 4.

In in pumping action, the head of water, then called the pressure head, is generally zero at the start and can increase progressively thereafter.

First it is necessary to start the pump 1. In order to do this, the automatic control 5 causes the opening of which inserts the converter 7 between the network 4 and the synchronous motor 3. The automatic control 5 then controls, via connection 8, the converter 7 in order to make it apply to the motor 3 a voltage of progressively increasing frequency, 1 hertz at the start, and then serveral hertz as the synchronous motor 3 begins to rotate.

When the startup is completed, the automatic control controls, via its connections 8 and 6, the speed of rotation of the pump to give it the value which, for the pressure head considered, corresponds to the maximum efficiency.

When the pressure head reaches the previously defined value Hd, i.e., 2.5 meters in the present case, it is necessary to disconnect the converter 7, as it could not stand a higher power. The automatic control 5 then commands the rise in frequency of the converter 7 such that the motor 3 is made to rotate at the synchronous speed, then the closing of switch 11, which puts the converter 7 out of circuit and couples the motor 3 directly to the network 4. Above the head Hd, the installation functions like a standard pumping installation, with a synchronous motor 3 coupled to the network 4, and a hydraulic pump 1.

Figure 2:
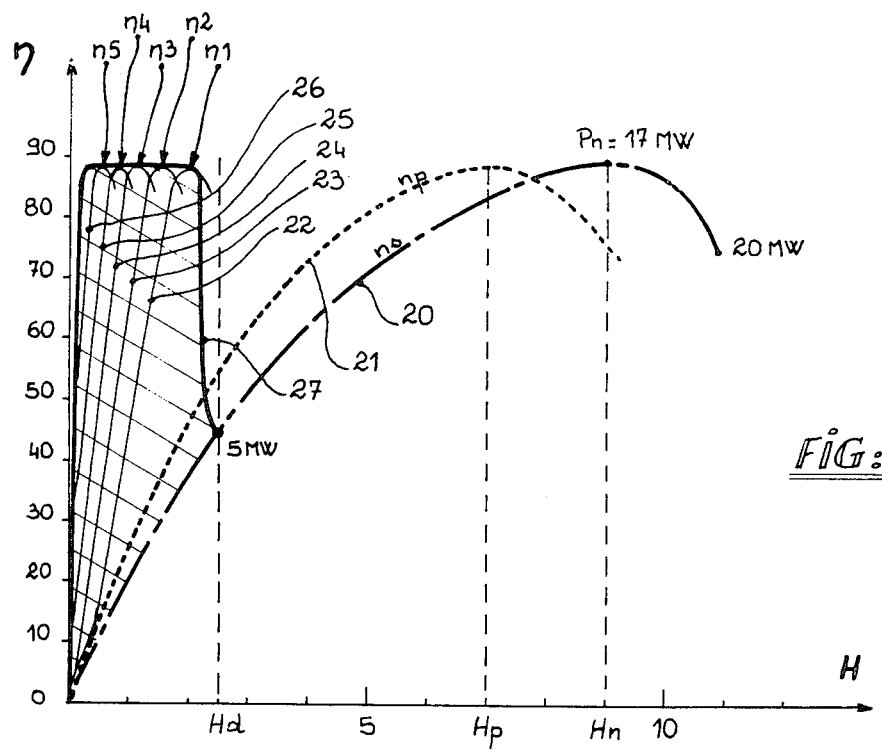
FIG. 2 is a set of curves enabling the increase in efficiency, due to the invention, to be evaluated.

We will now refer to FIG. 2, which, making use of the efficiency contour of the turbo-machine 1, shows a family of curves representing, for different speeds of rotation n of the turbo-machine 1, the variation in efficiency , in percent, as a function of the head of water H in meters.

The curve 20 corresponds to the standard functioning of the machine 1 without the converter 7, and for a synchronous speed ns corresponding to an alternating current of 50 cycles. It shows a maximum efficiency, namely 90%, for the nominal head Hn, i.e., 9 meters. The power supplied by turbine action, or consumed in pumping action, which as we know depends on the head H, is 17 MW for the nominal head Hn. On either side of the nominal head value Hn, the efficiency decreases very rapidly; it is no more than 75% for a head of 11 meters, where the power is 20 MW, and 45% for a head of 2.5 meters, where the poer is 5 MW. For a traditional installation, the turbine will not be made to operate for too low a head of water, less than 1.5 meters, for example, as more is then lost in operating cost than is gained by turbine action.

Curve 21 is the curve corresponding to a head of water Hp of 7 meters, approximately 22% lower than the nominal head Hn, in for which the efficiency has been returned to its maximum possible, i.e., 87% in the present example, by appropriate reduction of the speed of rotation of the turbine, which has changed to the value np, corresponding to an alternating current frequency of about 44 cycles per second, determined by the "contour" in our example. By comparison with the value of the efficiency at Hp given by curve 20, it can be seen that lowering the speed from ns to np makes the efficiency rise only from 82% to 87%. Considering the high cost of installation and operation of a high power frequency converter and of such a converter's own losses, precisely in the order of 5%, such an investment obviously would not appear profitable on using the process for these heads of water fairly close to the nominal head.

Curves 22, 23, 24, 25 and 26 are similar to curve 21, but are plotted for heads of water less than Hd, namely 2.5 meters, and for speeds of rotation n1, n2, n3, etc. . . . , corresponding in each case to the maximum possible efficiency; these values, here again determined by the "efficiency contours", correspond respectively to frequencies in hertz of 23, 20, 18, etc. . . . These curves show in a striking way the large increase in efficiency due to the matched reduction of the speed of rotation. In addition, the cost of installation and operation of a converter of a maximum power of 5 MW, as it has to operate only below Hd, is very much lower than that of a 17 MW converter, such that the economic balance of the operation appears very positive.

In the hydroelectric installation of the invention, in the range between 0 and Hd in which the converter (7, FIG. 1) is operational, the operating curve is the envelope of the curves 22, 23, 24, etc . . . and is represented by heavy line 27. The increase in efficiency due to the invention is therefore represented by the cross-hatched area contained between curve 27 and the lower part of curve 20.

I claim:

1. In a low-head hydroelectric installation, of the type including at least one hydraulic turbo-machine (1) constructed to give optimum efficiency under a defined head of water or pressure head (Hn), called the nominal head, corresponding to a nominal power (Pn) of the installation and for a speed of rotation corresponding to the speed of synchronism (ns) with the frequency of an electric network (4), and at least one rotary electrical machine (3) drive-coupled to said turbo-machine and electrically connected to said network, the improvement comprising automatic control means (5) enabling rotation of said turbo-machine at its speed of synchronism with the frequency of said network, comprising means (5, 9 to 11) making it possible, when said head of water or pressure head is less than a value (Hd) equal to a defined fraction less than one-half of said nominal head (Hn), to cause said turbo-machine to rotate at a speed lower than said synchronous speed, and consequently to insert between said network and said electrical machine a frequency matching device (7) of maximum power at least less than one-half of said nominal power.

2. The improvement claimed in claim 1, wherein said defined fraction of said nominal head is in the order of a quarter of the latter.

3. The improvement claimed in claim 1 or 2, wherein said means are automatic control means causing said turbo-machine to rotate, when said head of water or pressure head becomes less than the said value (Hd), at the speed giving the maximum efficiency for that turbo-machine.

4. The improvement claimed in claim 1 or 2, wherein said turbo-machine and said electrical machine are reversible machines, turbine and alternator in turbine action, pump and electric motor in pumping action, wherein one and the same frequency matching device (7) is used in turbine action and in pumping action and wherein said means permit, when the head of water is lower than said value (Hd), connection, during turbine action, of said matching device (7) between said alternator (3) driven by said turbine (1) and said electric network (4) that it supplies, and connection, during pumping action, of said matching device (7) between said electric supply network (4) and said electric motor (3) driving the pump (1).

5. Process for obtaining a frequency at the output of a turbo machine of a nominal power corresponding to a synchronous speed with respect to that of an electric network, comprising the (a) inserting a frequency matching device between said turbo machine and said network of maximum power at least less than half of said nominal power; and (b) connecting said frequency device to said turbo machine when the head of water or pressure head is less than a value equal to a defined fraction of nominal head, i.e., when said turbo machine rotates at a speed lower than said synchronous speed.

* * * * *